Patented Mar. 14, 1933

1,901,044

UNITED STATES PATENT OFFICE

OTTO SCHMIDT AND BERTHOLD SCHNELL, OF LUDWIGSHAFEN-ON-THE-RHINE, AND EGON MEYER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF ARTIFICIAL MASSES

No Drawing. Application filed May 4, 1929, Serial No. 360,615, and in Germany May 8, 1928.

It is already known that India rubber, when heated to a high temperature either in the solid state or in solution, furnishes conversion products termed cyclocaoutchouc. These conversion products no longer possess the properties of rubber, but form resinous to oily substances which are soluble in numerous solvents. Up to the present time, no technical application has been discovered for these products.

We have now found that valuable artificial masses, such as moulded articles or films of any desired size, for example coatings, foils or threads, applicable for numerous technical purposes, are obtained by heating the non-distillable polymerization products, which term includes also the non-distillable lower intermediate polymerization products, obtainable from butadiene or its substitution products in which the 1- or 1.4-positions of the butadiene have been substituted with hydrocarbon radicles. These hydrocarbons will hereinafter be referred to as "a butadiene". According to this manner of working, as for example by heating a non-distillable polymerization product of butadiene to high temperatures, with or without solvents, solid products analogous to the products known in the trade under the registered trade-mark "bakelite" can be obtained.

The temperature employed is, generally speaking, about between 100° and 500° C. depending on the nature of the polymerization product and the period of working chosen and of the products desired. Usually the main heating temperature is between 200° and about 400° C., though, in the commencement of the process it is sometimes advisable to start with a lower temperature.

It is to be understood that the said upper limits of temperature may relate to the temperature of the material itself and not only to the surrounding atmosphere and that they depend on the duration of the treatment.

The products prepared by heating under strenuous conditions or for a protracted period are, generally speaking, insoluble in any of the usual solvents, of high resistance to fracture and tension, and of considerable hardness. They offer a very high resistance to chemical agents and are almost completely insensitive to rises of temperature. Their electrical conductivity is very low, so that they are admirably suitable as insulating material. Being easily obtained in a colorless and transparent, or translucent, condition, they are also very suitable for the production of artificial masses, including large moulded articles.

The products obtained by heating under strenuous conditions possess the good properties of hard rubber. Hence, it is also possible to make a kind of hard rubber without using sulphur, a consideration which is sometimes very important in connection with insulation purposes, since hard rubber which has been prepared with sulphur, often in the course of time, exudes small amounts of sulphur which under the influence of the atmosphere become oxidized to sulphuric acid thus rendering the surfaces of the insulation conductive.

It is also possible, with the aid of the products herein described, to produce coatings of all kinds on any convenient foundations, by applying colored or uncolored polymerization products, or the aforesaid intermediate products, preferably in solution to the article to be coated, the latter being then heated.

In this manner, a tough and strongly adherent lacquer coating, distinguished by unusual elasticity and hardness, is obtained, for example from a polymerization product of butadiene. The hardness is often many times as great as that of ordinary lacquer coatings, and as a rule the coatings cannot be scratched at all by objects of medium hardness. The resistance to the influence of temperature and chemical agents being also extremely high, the quality of these coatings is considerably superior to that of most of those already known. By pouring the solutions on highly polished surfaces such as glass and the like and subjecting them to the aforesaid heat treatment films can be obtained which after removal from the surface may be employed for the most different purposes. On account of their being thoroughly transparent, of being easily dyed or colored for example by means of leaf gold and of being quite unhygroscopic they may find useful application for mouth pieces for example for cigarettes and the like.

Particularly valuable products are obtained when the initial solutions are subjected to a very far reaching purification before their employment. This effect can be obtained by subjecting the solutions to sedimentation, centrifuging, intense filtration or to a combination of several of these steps. Thus, for example, the dilute solution of the polymerization product, for example in cyclohexane is left standing for a considerable time, whereupon the solution is separated from any particles precipitated and is centrifuged or filtered for example through linen or felt. If a further purification is required for example, when transparent foils or threads are to be produced by means of the solutions, any impurities can be removed by passing the solution through a series of wadding pads of cotton or glass wool, which purification can be further improved by passing the solution through leather, porous stone or porcelain or fritted glass, in which latter cases passing the solutions is enhanced by the application of pressure. If desired also cataphoresis can be employed.

The heating process is usually performed in an atmosphere free from oxygen, such as an atmosphere of hydrogen, steam, nitrogen or carbon dioxide, but in some cases some oxygen may be present, which, apparently, is consumed sometimes.

The artificial masses obtained in the manner herein described are admirably suitable, by reason of their freedom from sulphur compared with hard rubber, for numerous purposes, especially those of insulation. For example, according to this process, mica plates can be very firmly cemented together and thereby furnish extremely stable insulating materials, resisting puncturing. The present process also allows, owing to the absence of color and the high cohering strength of the products, of cementing sheets of glass in making non-splintering glass, or for cementing lenses and the like by combining the single constituent with a layer of the polymerization product and heating the whole while subjecting it to mechanical pressure. In contrast to the so-called glyptal resins already known, which are largely used for these purposes but which cannot be hardened when in the state of thin layers between other substances, as for example mica plates, there is no difficulty in producing the above described compositions, even under these conditions.

The conversion of the said polymerization products, or the non-distillable products obtained in an antecedent stage, can also be effected by heating under elevated or reduced pressure, in which latter case any solvents employed can be easily removed simultaneously. In this case use may also be made of accelerators, such as inorganic halogen compounds, acids, bases and the like. It is often also advisable to add oxidation retarders, such as aldol-alpha-naphthylamine or other condensation products of aldehydes and amines. In the process according to the present invention organic solvents and other additions, such as plasticizers, such as aryl-phosphates, petroleum jelly, waxes, high boiling oils and the like or also India rubber or polymerization products of isomers of butadiene or of its aforesaid substitution products, for example isoprene. Since India rubber is assumed to be a natural polymerization product of isoprene all these products will be referred to as polymerization products of other diolefines. Also fillers such as barium sulphate, asbestos, or, in some cases, animal or vegetable fibrous materials, and the like, may be added, and also coloring agents if desired. There is no need to start with the finished ploymerization product, on the contrary, lower but also non-distillable polymerization products may also be employed as the initial substances. Such products can be obtained, for example, by prematurely interrupting the polymerization of the butadiene and the like, or by employing retarding agents in the polymerization process. By carrying out the heating at lower temperatures or for a shorter period, products can be obtained which are less hard and insoluble than those above described. By modifying the amount of the additional substance, it is also possible to vary the mechanical properties and in particular the hardness of the products within wide limits.

The following examples will further illustrate the nature of the said invention but the invention is not restricted to these examples. The parts are by weight.

*Example 1*

A polymerization product prepared from butadiene with the aid of sodium is heated to from 250° to 300° C. air being excluded. At first, a plastic product is obtained which, on prolonged heating, becomes perfectly hard and solid. The finished product is colorless and clear as water. It can easily be cut into thin plates capable of application, for example, as a substitute for window glass. If plasticizing agents be employed in the manufacture of the product, foils also can be cut from the finished product. Inter alia, India rubber, or polymerization products of isoprene or the like which do not become hard but soft when heated to high temperatures, may also be used as plasticizers.

*Example 2*

100 parts of a polymerization product prepared from butadiene with the aid of sodium are heated with 300 parts of cyclohexane in an autoclave at from 250° to 300° C. for from 15 to 20 hours, air being excluded. After this treatment, the contents of the autoclave consist of a solid, colorless substance, in addition to unaltered cyclohexane.

*Example 3*

The plastic product obtained by the incomplete polymerization of butadiene with the aid of sodium is moulded, and hardened by protracted heating at from 250° to 300° C. whereby a moulded hard artificial article is obtained.

*Example 4*

The plastic mass obtained by the polymerization of butadiene in the presence of sodium and with an addition of from 5 to 10 per cent of xylene, parafin oil or other high boiling hydrocarbons, is purified, pressed in a mould and heated therein in the manner specified in Example 3. For the above purpose it is highly advantageous to employ a polymerization product obtained from limpid solutions by evaporation. The procedure is similar when other polymerization products are used, as for example a polymerization product prepared from butadiene with the aid of an ozonide of butadiene, or of another unsaturated compound, and polymerization products of the beforementioned substitution products of butadiene.

*Example 5*

60 parts of the polymerization product described in Example 1 are rolled intimately together with 40 parts of lamp black whereupon the mass obtained is heated in a moulding press for from 2 to 3 hours to a temperature of 150° C. and at a pressure of about 50 atmospheres and subsequently after removal from the press for from 3 to 5 hours at about 250° C. without the application of mechanical pressure. A black moulded body resembling hard rubber and possessing good mechanical properties is obtained. When the heating and pressing process is performed in moulds with highly polished inner walls the finished articles are obtained with a smooth shining surface which does not require considerable further working.

*Example 6*

A solution in cyclohexane, benzene or any other suitable solvent of a polymerization product of butadiene prepared with the aid of sodium, is poured or sprayed on a metal sheet, whereupon the whole is heated in an atmosphere free from oxygen for several hours and at a temperature of about 250° C. after the complete evaporation of the solvent employed. A coating is obtained resembling those prepared with lacquers and possessing a very great hardness, resistance to heat and to solvents of any kind and other chemical agents. A heating process performed in an atmosphere containing oxygen proceeds considerably more quickly than that performed in the absence of oxygen and at a lower temperature, but in the absence of agents preventing oxidation, a discoloration may occur at the above temperatures.

*Example 7*

A polymerization product obtained from 1-methyl-butadiene (piperylene) with the aid of 0.5 per cent its weight of aluminum chloride is carefully freed from aluminum chloride and dried at about 150° C., whereupon the mass is moulded and heated for several hours at a temperature of from 250° to 300° C.

*Example 8*

A product obtained by extended heating of butadiene to a temperature of about 70° C. in the presence of 20 per cent its weight of a 3 per cent aqueous solution of hydrogen peroxide, is heated for from 8 to 10 hours to a temperature from 300° to 325° C., whereby a transparent hard product is obtained. The aforesaid polymerization product can be replaced by similar polymerization products obtainable by heating butadiene in the presence of ozonides or of albumen or of both these agents.

*Example 9*

10 parts of a polymerization product which has been prepared from butadiene with the aid of sodium and then purified, are rolled intimately together with 60 parts of emery powder, whereupon the mixture is pressed at about 150° C. and at from 150 to 300 atmospheres into discs which are then heated for a longer time to from 275° to 300° C. By modifying the quantity employed of the single constituents of the mixture, the period of heating and the temperature, the hardness and strength of the products can be varied within wide limits, so that products may be obtained which can be employed as emery wheels for the most different purposes of grinding or polishing.

In a corresponding manner artificial masses and bodies of any form and size can be obtained which, if desired, may contain other filling materials, dyestuffs and other suitable additions for the manufacture of billiard balls, buttons, knobs, handles, insulating materials for the high-tension electric industries, penholders, combs and the like.

The products and especially those which have been obtained from polymerization products of butadiene prepared with the aid of alkali metals, show a very high disruptive strength (up to 80,000 volts per millimeter) and extraordinarily high stability to pressure of about 2250 kilograms per square centimeter and a relatively high compressibility of about 25 per cent by volume. For these reasons the products are particularly suitable for application as packings, insulating materials for electrical leads into high pressure apparatus, and as supports, linings and the like of heavy apparatus which is desired to be insulated from an electrically conducting base.

*Example 10*

A 30 per cent solution in cyclohexane of the polymerization product referred to in the foregoing example and which has been freed from sodium by means of water or of diluent solutions of acids, and from insoluble constituents and of water by subsequent dissolution, repeated filtration and drying, is pressed through spinning nozzles as are employed in the manufacture of artificial silk, into a vertically arranged pipe of about 8 meters length which latter is heated from outside. The temperature within the pipe rises from about 100° C. at the top to 300° to 400° C. or even more at its bottom, and the atmosphere within the tube is kept poor in or free from oxygen so that the threads formed do not ignite, for example by introducing nitrogen, carbon dioxide, hydrogen, methane, steam or the like or mixtures thereof. The threads arriving at the bottom of the pipe are completely dry, smooth and hard and are wound on bobbins or quills, the threads being stretched, if desired, during their passage through the pipe. At its bottom, the pipe is preferably closed and the vapors of the solvent are preferably sucked off and condensed for reuse. Instead of a single pipe a series thereof for example in the form of chambers connected with each other side by side can be employed, each of these chambers containing one or more spinning devices, as desired. The solutions fed into the nozzles should be carefully freed from any solid substances such as dirt, dust and the like and should be made completely homogeneous before spinning. On the other hand the solutions may be previously subjected to an ageing process. Instead of solutions in cyclohexane, solutions in chlorinated hydrocarbons, such as methylene chloride and homologues of cyclohexane or in different low boiling fractions of petroleum can be employed and the solutions may contain, if desired, also solvents or diluents of a rather high boiling point and/or softening agents, which are stable to the influence of heat, for example aryl phosphates, and which may also reduce the inflammability, such as tricresyl phosphate. When threads are to be produced which can be dyed with particular ease, a small quantity of a solvent with a low boiling point may be present in the solutions. By modifying the length of the pipe employed, the temperature and the period of heating the threads, the latter are more or less elastic and can be provided with any desired degree of hardness. By working at a lower temperature than that stated above, oxygen must not be excluded from the atmosphere in the spinning chamber. The reeled material is then further worked and spun in the usual manner. When threads are obtained by any reason or requirement which are too soft for a desired purpose these can be hardened by a subsequent further heating, in which process the appearance of the threads is slightly altered and they may achieve a silvery or golden lustre depending on the duration and temperature of this aftertreatment and on the nature of the atmosphere in the heating chamber. Thus, for example, by a mild aftertreatment, such as at about between 100° and 300° C. in the absence of oxygen a silvery lustre is obtained whereas stronger physical conditions of working such as a temperature between about 150° and 400° C. and especially a prolonged treatment and the presence of oxygen lead to a golden color and lustre of the threads, which threads are particularly valuable for the production of special effects. The threads aftertreated in this manner can be more easily dyed for example with basic dyestuffs than the original threads.

Instead of the aforesaid polymerization product, polymerization products of a butadiene substituted in the 1- or in the 1.4-positions by a hydrocarbon radicle or of polymerization products prepared from the beforementioned butadiene hydrocarbons in another manner than with the aid of sodium, can be employed, and also a mixture of the aforesaid polymerization products with up to 50 per cent its weight either of a polymerization product of isoprene or of purified India rubber which latter is considered also to be a natural polymerization product of isoprene.

If desired the finished threads can be treated with fire-proofing agents, such as tungstates or phospho-tungstates, or can be loaded with these salts or with other agents which may possess only a weighting effect.

By working in the aforesaid manner threads with a high lustre are obtained possessing a very high strength which is practically equivalent to that of the artificial silk made from cellulose and its derivatives. In contrast of these latter products, however, the strength of the threads prepared in the aforesaid manner remains the same also with the threads in the wet state, so that in this state their strength is several times higher than that of wet artificial silk. Moreover, the present threads are distinguished over the common artificial silk by their insentiveness to chemical influences (such as those of alkaline agents, acids, halogens, hypochlorites and the like) and physical action (such as that of light or heat) so that they are considerably superior to the hitherto known artificial silk.

The threads obtainable according to this example and to the following Example 14 can be advantageously employed for the production of yarns and fabrics woven therewith or containing the same. On account of their enormous resistance to solvents and other chemical agents such fabrics can find useful application for filtering purposes in the form of felt, cloth or the like. For the said manufacture of yarn and fabrics the threads obtained, preferably by means of a nozzle head with numerous nozzles, and possessing a diameter of a few hundredths of a millimeter such as from 1 to 2 denier are twined into stronger yarns and woven into fabrics in the usual manner, which may be employed as such or dyed; if desired the threads or yarns may be also dyed before wearing. Particularly valuable effects can be obtained by dyeing mixed fabrics containing the said yarns and natural or other artificial fibres with dyestuffs which possess an affinity only for one or the other fibrous constituent or with mixtures of such dyestuffs.

The fabrics produced with the aforesaid yarns are considerably more resistant to heat up to 300° C. than those of other fibres and very fast to ironing and unaffected by water, acids or alkalies and organic solvents so that the fabrics are extremely fast to exposure and wear. Moreover their lustre is generally less glassy than that of the usual artificial silk and superior thereto.

Example 11

100 parts of a polymerization product obtained from butadiene with the aid of sodium are intimately rolled together with 300 parts of a mineral coloring material, such as English red, Terra di Siena, umber or ultramarine, and moulded and heated in the aforesaid manner. The moulded pieces obtained show beautiful shades and can be easily polished to a high lustre; by the application of mixtures of the aforesaid or of other coloring materials patterns resembling to marble or other mottled patterns can be obtained. If desired, also organic coloring materials can be employed so far as they are sufficiently stable at the aforesaid temperature of working.

Example 12

80 parts of bleached kieselguhr and 20 parts of a polymerization product obtained by the action of sodium on butadiene are intimately mixed and then subjected to mechanical pressure of about 50 atmospheres for a period of 6 hours and at from 150° to 200° C., whereby a pliable solid product which can be cut into thin discs is obtained. The discs can be employed as such, or they may be further hardened by heating them at a temperature above that stated, whereby their elastic properties are partly removed. The products obtained with the application of a temperature of about 150° C. can be employed as elastic linings or endless running belts in transporting devices and the like and preferably as substitutes for leather and other leather substitutes.

In the aforesaid process the kieselguhr may be replaced by other fillers, such as lampblack, zinc white, magnesium oxide and the like and the ratio of the ingredients employed can be varied within wide limits. When rather low temperatures, such as about 150° C. are employed, the filling materials may consist also of a fabric of animal or vegetable fibres, such as wool, cotton or linen fabrics.

Example 13

A metal bobbin, such as is employed in the manufacture of artificial silk, is dipped into an about 5 per cent solution in benzene of a polymerization product, such as can be obtained by the action of sodium wire on butadiene in the presence of butylene or of other similar solvents, dried and immersed again in the said solution for several times. The bobbin is then heated for some hours at a temperature from 100° to 150° C., whereby the coating is hardened. The finished coating is very smooth, nonsticky and adheres extremely fast to the bobbin and is very stable against the action of the precipitating or washing baths usually employed in the manufacture of artificial silk. In order to shorten the period of heating, the aforesaid solution may be incorporated with drying agents such as linoleates, for example linoleic cobalt or manganese, or naphtenates of such or similar metals.

Example 14

A polymerization product, which has been prepared at 50° C. by the action of sodium on butadiene, dissolved in an equal amount of cyclohexane, is purified, for example, in the manner described in Example 10, and dissolved in cyclohexane, so that a from 20 to 25 per cent solution is obtained, whereupon the solution is spun into threads in the manner described in Example 10. Since the solution is thoroughly homogeneous and possesses a high viscosity it emerges very slowly and without cracking or forming drops from the spinning nozzle even at a pressure of from 25 to 30 atmospheres, and the thread can be considerably stretched during the heating process. By working in this manner very fine threads of from 1 to 2 denier with a lustre resembling silver and of a very high strength are obtained. The said polymerization product as well as that employed in Example 13 yields artificial threads with a wonderful soft mother of pearl lustre. On account of their unhygroscopicity, strength and high insulating power the threads can be favorably employed also for covering electric wires.

The expression "a butadiene" wherever it occurs in the claims is to be interpreted to include only butadiene itself and its substitution products in which the 1- or 1.4-positions of the butadiene have been substituted by hydrocarbon radicles, these substitution products in which the 2, 3-positions of the butadiene are substituted being excluded.

What we claim is:—

1. The process for the production of artificial masses which comprises heating a non-distillable polymerization product of a butadiene to a temperature between about 100° and 500° C. until the product has practically completely lost its tensile elasticity.

2. The process for the production of artificial masses which comprises heating a non-distillable polymerization product of butadiene to a temperature between about 100° and 500° C. in the absence of oxygen until the product has practically completely lost its tensile elasticity.

3. The process for the production of artificial masses which comprises heating a mixture containing a non-distillable polymerization product of a butadiene and a plasticizing agent to a temperature between about 100° and 500° C. until the product has practically completely lost its tensile elasticity.

4. The process for the production of artificial masses which comprises heating a non-distillable polymerization product of a butadiene conjointly with a non-distillable polymerization product of another diolefine to a temperature between about 100° and 500° C. until the product has practically completely lost its tensile elasticity.

5. The process for the production of artificial masses which comprises heating a solution of a non-distillable polymerization product of a butadiene to a temperature between about 100° and 500° C. until the product has practically completely lost its tensile elasticity.

6. The process for the production of artificial masses which comprises heating a solution of a non-distillable polymerization product of butadiene to a temperature between about 100° and 500° C. in the absence of oxygen, until the product has practically completely lost its tensile elasticity.

7. The process for the production of artificial masses which comprises heating a solution of a non-distillable polymerization product of butadiene and of a non-distillable polymerization product of another diolefine to a temperature between about 100° and 500° C. in the absence of oxygen until the product has practically completely lost its tensile elasticity.

8. The process for the production of artificial masses which comprises heating a mixture comprising a non-distillable polymerization product of a butadiene and a filling material to a temperature between about 100° and 500° C. until the product has practically completely lost its tensile elasticity.

9. The process for the production of artificial silk which comprises heating a fine jet of a solution of a non-distillable polymerization product of a butadiene to a temperature between about 100° and 500° C. until the product has practically completely lost its tensile elasticity.

10. The process for the production of artificial silk which comprises heating a fine jet of a solution of a non-distillable polymerization product of butadiene to a temperature between about 100° and 500° C. in the absence of oxygen until the product has practically completely lost its tensile elasticity.

11. The process for the production of artificial silk which comprises heating a fine jet of a solution of a non-distillable polymerization product of a butadiene to a temperature between about 100° and 500° C. until the product has practically completely lost its tensile elasticity and further heating the product obtained to a temperature between about 100° and 450° C.

12. The process for the production of artificial silk which comprises heating a fine jet of a solution of a non-distillable polymerization product of butadiene to a temperature between about 100° and 500° C. in the absence of oxygen until the product has practically completely lost its tensile elasticity and further heating the product obtained to a temperature between about 100 and 450° C.

13. As new articles of manufacture solid artificial masses which are insoluble in practically all chemical agents and solvents, possess at the most a slight elasticity and comprise a product obtainable by heating a non-distillable polymerization product of a butadiene to a temperature between about 100° and 500° C. until the product has practically completely lost its tensile elasticity.

14. As new articles of manufacture solid artificial masses which are insoluble in practically all chemical agents and solvents, possess at the most a slight elasticity and comprises a product obtainable by heating a non-distillable polymerization product of butadiene until the product has practically completely lost its tensile elasticity.

15. As new articles of manufacture solid artificial masses which are insoluble in practically all chemical agents and solvents, possess at the most a slight elasticity and comprise a product obtainable by heating a mixture of a non-distillable polymerization product of a butadiene with a filler to a temperature between about 100° and 500° C. until the product has practically completely lost its tensile elasticity.

16. As new articles of manufacture from transparent to translucent pliable artificial masses which are insoluble in practically all chemical agents and solvents, possess at the most a slight elasticity and comprise a product obtainable by heating a non-distillable polymerization product of a butadiene to a temperature between about 100° and 500° C. until the product has practically completely lost its tensile elasticity.

17. As new articles of manufacture transparent artificial masses of a thickness below 1 millimeter which are insoluble in practically all chemical agents and solvents, possess at the most a slight elasticity and comprise a product obtainable by heating a non-distillable polymerization product of a butadiene to a temperature between about 100° and 500° C. until the product has practically completely lost its tensile elasticity.

18. As new articles of manufacture artificial threads which are insoluble in practically all chemical agents and solvents, possess at the most a slight elasticity and comprise a product obtainable by heating a non-distillable polymerization product of a butadiene to a temperature between about 100° and 500° C. until the product has practically completely lost its tensile elasticity.

19. As new articles of manufacture artificial threads which are insoluble in practically all chemical agents and solvents, possess at the most a slight elasticity and comprise a product obtainable by heating a non-distillable polymerization product of a butadiene and of a non-distillable polymerization product of another diolefine to a temperature between about 100° to 500° C. until the product has practically completely lost its tensile elasticity.

20. As new articles of manufacture fabrics containing artificial threads which are insoluble in practically all chemical agents and solvents, possess at the most a slight elasticity and comprise a product obtainable by heating a non-distillable polymerization product of a butadiene to a temperature between about 100° and 500° C. until the product has practically completely lost its tensile elasticity.

21. The process for the production of artificial silk which comprises heating a fine jet of a solution of a non-distillable polymerization product of a butadiene and of another diolefine to a temperature between about 100° and 500° C. until the product has practically completely lost its tensile elasticity.

22. The process for the production of artificial silk which comprises heating a fine jet of a solution of a non-distillable polymerization product of a butadiene and of another diolefine to a temperature between about 100° and 500° C. in the absence of oxygen until the product has practically completely lost its tensile elasticity.

23. As new articles of manufacture fabrics containing artificial threads which are insoluble in practically all chemical agents and solvents, possess at the most a slight elasticity and comprise a product obtainable by heating non-distillable polymerization product of a butadiene, polymerized in the presence of another liquid hydrocarbon, to a temperature between about 100° and 500° C. until the product has practically completely lost its tensile elasticity.

24. A process for the production of artificial masses which comprises heating a non-distillable polymerization product of a butadiene to a temperature between about 100° and 500° C. until the product has practically completely lost its tensile elasticity and further heating the resulting product in the presence of oxygen to from about 100° to 400° C.

25. A film composed of an artificial substance practically insoluble in all chemical agents and solvents and comprising a product obtainable by heating a non-distillable polymerization product of a butadiene to a temperature between about 100° and 500° C. until it has practically completely lost its tensile elasticity.

In testimony whereof we have hereunto set our hands.

OTTO SCHMIDT.
BERTHOLD SCHNELL.
EGON MEYER.